United States Patent
Natarajan

(10) Patent No.: US 7,873,821 B2
(45) Date of Patent: Jan. 18, 2011

(54) BIOS CONFIGURATION AND MANAGEMENT

(75) Inventor: Sivagar Natarajan, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 947 days.

(21) Appl. No.: 11/786,201

(22) Filed: Apr. 11, 2007

(65) Prior Publication Data

US 2008/0256351 A1    Oct. 16, 2008

(51) Int. Cl.
*G06F 15/177* (2006.01)
(52) U.S. Cl. .......................................... 713/2; 710/10
(58) Field of Classification Search ............... 710/10; 713/2

See application file for complete search history.

(56) References Cited

U.S. PATENT DOCUMENTS

| | | | |
|---|---|---|---|
| 5,704,035 A | 12/1997 | Shipman | |
| 5,850,562 A | 12/1998 | Crump et al. | |
| 6,704,840 B2 | 3/2004 | Nalawadi | |
| 6,772,266 B2 | 8/2004 | Nalawadi | |
| 6,785,806 B1 | 8/2004 | Schaefer et al. | |
| 7,415,545 B1 * | 8/2008 | Brown | 710/8 |
| 7,500,094 B2 * | 3/2009 | Phelps et al. | 713/2 |
| 7,689,818 B2 * | 3/2010 | Chen | 713/1 |
| 2004/0150645 A1 | 8/2004 | Burrell | |
| 2004/0172498 A1 | 9/2004 | Taylor | |

* cited by examiner

*Primary Examiner*—Albert Wang
(74) *Attorney, Agent, or Firm*—Hope Baldauff Hartman, LLC

(57) ABSTRACT

The present invention provides a system and method for a modular and enhanced kernel device manager (KDM). KDM is passed control during POST after Enhanced Device Initialization Manager (eDIM) has performed device initialization. KDM configures and manages all the devices enumerated by the eDIM. KDM groups these devices into Input Device, Output Device and/or Storage Device classifications and links them with proper class specific kernel (Input Kernel, Output Kernel, and Storage Kernel) through an Input Pipe, Output Pipe, and/or Storage Pipe.

18 Claims, 11 Drawing Sheets

```
struct InputPipeData {
      POINTER    pNextSiblingPipe;   //Pointer to next sibling pipe
      POINTER    pNextInputPipe;     //Pointer to next input pipe
      POINTER    pFunctionEntry;     //Pointer to API function
      POINTER    pDeviceInfoStruc;   //Pointer to device info
      structure
      BYTE       bPipeType;          //Pipe type - Input
} PIPE_DATA;
```

FIG. 5A

```
struct OutputPipeData {
      POINTER   pNextSiblingPipe;  //Pointer to next sibling pipe
      POINTER   pNextInputPipe;    //Pointer to next output pipe
      POINTER   pFunctionEntry;    //Pointer to API function
      POINTER   pDeviceInfoStruc;  //Pointer to device info
      structure
      BYTE      bPipeType;         //Pipe type - Output
} PIPE_DATA;
```

FIG. 6A

```
struct StoragePipeData {
    POINTER   pNextSiblingPipe;  //Pointer to next sibling pipe
    POINTER   pNextInputPipe;    //Pointer to next storage pipe
    POINTER   pFunctionEntry;    //Pointer to API function
    POINTER   pDeviceInfoStruc;  //Pointer to device info
    structure
    BYTE      bPipeType;         //Pipe type - Storage
} PIPE_DATA;
```

FIG. 7A

BIOS CONFIGURATION AND MANAGEMENT

TECHNICAL FIELD

The present invention relates generally to methods of programming electrical computers and data processing systems, and more specifically to a BIOS (Basic Input/Output System) method, apparatus and system for device identification, initialization and management in said systems.

BACKGROUND OF THE INVENTION

When computers are initially turned on or reset, they typically go through a "booting" process. When a computer "boots" a built-in diagnostic program known as a power-on self-test (POST) is performed wherein various tests are run to confirm core components of the computer system are present and functioning properly and wherein the registers within certain hardware devices are initialized. Part of performing the POST involves loading the basic input and output system (BIOS) code into memory. A computer system requires BIOS to control the basic hardware operations, such as interactions with disk drives, the display, the keyboard, and other peripheral devices. After performing the POST, the computer typically loads an operating system (OS).

More specifically, the BIOS is a collection of instructions known as firmware routines typically hardwired into a read-only-memory (ROM) device of a computer used by a processor of a computer to identify, initialize, allocate configure and manage other system hardware. The BIOS is the lowest-level software in the computer system acting as an interface between the hardware (especially the processor) and higher level programs such as the OS. By providing a set of low-level routines the BIOS enables the OS to interface with different hardware devices while in operation, thus facilitating the operation of various software applications. The BIOS is also responsible for allowing control of a computer's hardware settings, for booting up the computer when the power is turned on or when the reset button is activated, and various other system functions.

However, in view of the present invention, the prior art BIOS is deficient in many ways. More specifically, the prior art BIOS implementation consists of a lengthy series of undivided code unable to perform discrete functions or tasks. Additionally, the prior-art BIOS consists of undivided code unable to perform any subset of functions specific to a particular hardware device. If a programmer wishes to amend the prior-art BIOS to add or delete an existing feature or function, or to add or delete hardware, the programmer must search the entire code line-by-line to locate the appropriate code section or sections within the BIOS, thus resulting in an inefficient and time consuming task.

In addition, the prior-art BIOS implementation is unable to cope with the growing complexity and requirements of new computer platforms, components, features, processors, peripherals, applications and/or operating systems. More specifically, complete re-writing of the BIOS code is required for compatibility with new platforms, such as going from Intel Architecture IA32 to IA64 or other future evolutions.

Furthermore, the prior-art BIOS implementation for resource allocation for devices is set to allocate 2X the resource requirement for a device resulting in over allocation and waste of system resources for each device within the computer system.

Therefore, it is readily apparent that there is a need for a new BIOS method that is modular in design allowing for a simplified process for the removal or addition of support for new computer platforms, components, features, processors, peripherals, applications, operating systems and/or avoiding over allocation of system resources.

BRIEF SUMMARY OF THE INVENTION

Briefly described, in the preferred embodiment, the present invention overcomes the above-mentioned disadvantages and meets the recognized need for such a process by providing a new modular firmware solution of BIOS code.

According to its major aspects and broadly stated, the present invention in its preferred embodiment is a Kernel Device Manager (KDM). KDM is passed control during POST after Enhanced Device Initialization Manager (eDIM) has performed device initialization. eDIM facilitates bus and device enumeration, and device resource allocation during POST. eDIM finds, unpacks, and creates a driver list for all drivers; eDIM initializes both the configuration manager and the resource manager; eDIM allocates the root node and searches the driver list for the root node driver; eDIM prepares to enumerate the root node and enumerates the root node and all buses and devices systematically stemming from the root node, each an eNode; and eDIM allocates resources for the root node and all buses and devices stemming from the root node by allocating correct memory and I/O space resource requirement for such devices.

More specifically, KDM configures and manages all the devices enumerated by eDIM. KDM groups these devices into Input Device, Output Device and/or Storage Device classifications and links them with proper class specific kernel (Input Kernel, Output Kernel, and Storage Kernel) through an Input Pipe, Output Pipe, and/or Storage Pipe. Furthermore, KDM describes the structure of class modules, technology specific modules and defines protocol for inter-module communication. Still further, KDM controls the runtime portion of the BIOS.

KDM, like eDIM, is a modular system of POST BIOS code that simplifies and quickens the process for the removal or addition of support for new computer platforms, components, features, processors, peripherals, devices, applications, and operating systems. Modularity eliminates the need for a programmer to rewrite and debug code line-by-line when supporting new and evolving architectures including new devices and features as well as down scaling the BIOS code for a specific computer system.

Since KDM is modular in design and consists of isolated code sections that perform specific functions and/or further consists of subroutines that support specific hardware devices, a programmer may amend individual code sections or subroutines without having to search the entire BIOS code line-by-line for applicable code. Thus, because KDM is modular, it allows a programmer to quickly remove or add support for new computer platforms, components, features, processors, peripherals, devices, applications and/or operating systems by accessing, editing, adding and/or deleting the specific BIOS code section or subroutine that pertains to a particular device, technology, feature and/or function.

KDM performs several functions in its preferred embodiment consisting of but not limited to the following steps. KDM configures and manages all the devices enumerated by eDIM. KDM groups devices into Input, Output and Storage class devices and links them with proper class specific kernel. KDM manages the devices through the Input, Output and Storage kernels.

Accordingly, a feature and advantage of the present invention is its ability to provide support for IA64, IA32 and x64 platform architectures, 64 bit addressing and its ability to evolve with future architectures.

Another feature and advantage of the present invention is its ability to provide support for full BIOS modularity and scalability solutions, thereby facilitating the removal or addition of support for a particular bus or device.

Still another feature and advantage of the present invention is its ability to provide a modular solution, thereby allowing customization and specialization of the BIOS code for a specific computer system.

Yet another feature and advantage of the present invention is its ability to provide support for legacy free and legacy platform architecture, including, extended industry standard architecture (EISA) industry standard architecture (ISA) and plug-n-play industry standard (PnPISA).

Yet another feature and advantage of the present invention is its ability to provide support for efficient resource management and manual resource configuration.

Yet another feature and advantage of the present invention is its ability to provide support for pre-configured or closed platform configured systems.

Yet another feature and advantage of the present invention is its ability to provide support for bridge hopping.

Yet another feature and advantage of the present invention is its ability to provide support for docking and hot-plug bus and devices.

Yet another feature and advantage of the present invention is its ability to provide support to handle option ROMs efficiently.

Yet another feature and advantage of the present invention is its ability to provide support for separate north and south bridge code.

Still yet another feature and advantage of the present invention is its ability to provide support for error logging for debugging purposes.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 5A is a high level code representation of the resource data structure for input pipe according to the preferred embodiment of the present invention;

FIG. 6A is a high level code representation of the resource data structure for output pipe according to the preferred embodiment of the present invention;

FIG. 7A is a high level code representation of the resource data structure for storage pipe according to the preferred embodiment of the present invention.

DETAILED DESCRIPTION OF THE PREFERRED AND ALTERNATIVE EMBODIMENTS

Figure 1:
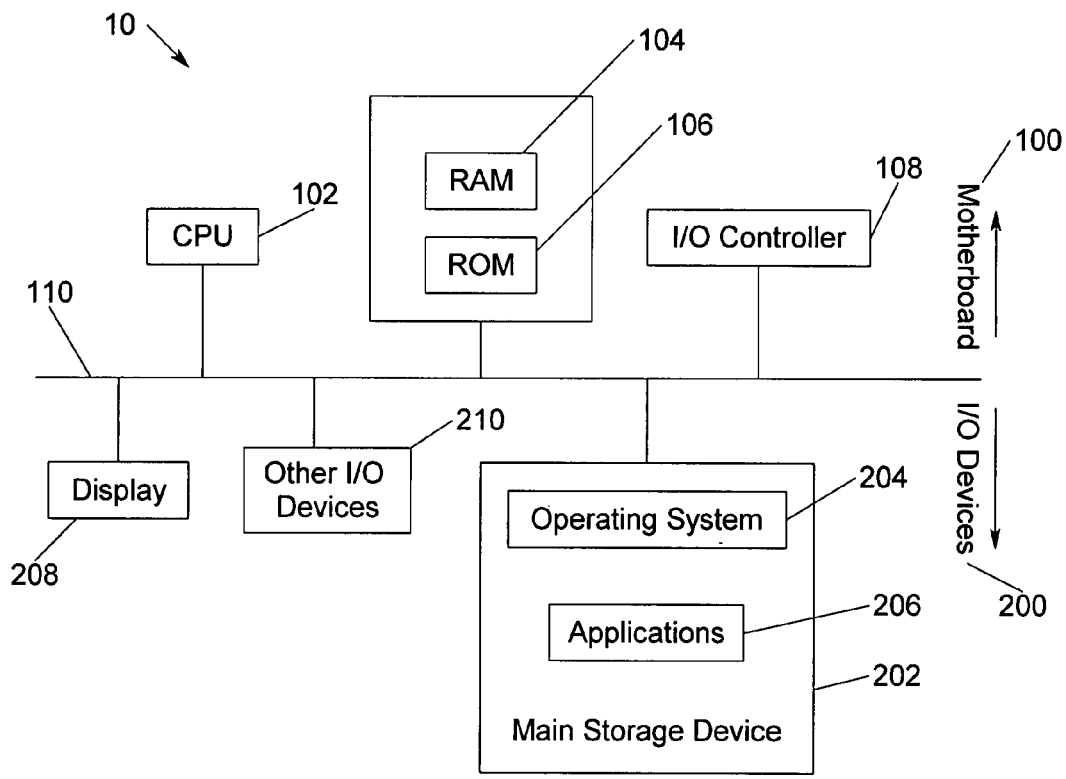
FIG. 1 is a block diagram of a computer system environment for embodiments of the present invention.

In describing the preferred and alternate embodiments of the present invention, as illustrated in FIGS. 1-8, specific terminology is employed for the sake of clarity. The invention, however, is not intended to be limited to the specific terminology so selected, and it is to be understood that each specific element includes all technical equivalents that operate in a similar manner to accomplish similar functions.

As will be appreciated by one of skill in the art, the present invention may be embodied as a method, data processing system, or computer program product. Accordingly, the present invention may take the form of an entirely hardware embodiment, entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, ROM, RAM, CD-ROMs, optical storage devices, or magnetic storage devices.

The present invention is described below with reference to flowchart illustrations of methods, apparatus (systems) and computer program products according to embodiments of the invention. It will be understood that each block or step of the flowchart illustrations, and combinations of blocks or steps in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create devices and/or means for implementing the functions specified in the flowchart block or blocks/step or steps.

These computer program instructions may also be stored in a computer-usable memory that can direct a computer or other programmable data processing apparatus to function in a particular manner, such that the instructions stored in the computer-useable memory produce an article of manufacture including instruction means which implement the function specified in the flowchart block or blocks/step or steps. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks/step or steps.

Accordingly, blocks or steps of the flowchart illustrations support combinations of means for performing the specified functions, combinations of steps for performing the specified functions and program instruction means for performing the specified functions. It should also be understood that each block or step of the flowchart illustrations, and combinations of blocks or steps in the flowchart illustrations, can be implemented by special purpose hardware-based computer systems which perform the specified functions or steps, or combinations of special purpose hardware and computer instructions.

Computer programming for implementing the present invention may be written in various programs, including, but not limited to conventional high level programming languages, such as C programming language. However, it is understood that other source and/or object oriented programming languages, and other conventional programming languages may be utilized without departing from the spirit and intent of the present invention.

Referring now to FIG. 1-8, the present invention in its preferred embodiment is a BIOS solution for loading all device kernels, technology modules and creating communication pipes between such device kernels and technology modules during POST, wherein the process for the removal or addition of support for new computer platforms, components, features, processors, peripherals, applications and/or operating systems is simplified and made more efficient. Definitions for terms and acronyms used herein can be found at http://www.ami.com/support/glossary:cfm#i American Megatrends Glossary of Terms and are incorporated herein by reference.

Referring now to FIG. 1, there is illustrated a block diagram of a computer system 10 that provides a suitable environment for implementing embodiments of the present invention. The computer architecture shown in FIG. 1 is divided into two groups, motherboard 100 and input/output (I/O) devices 200. Motherboard 100 preferably includes subsystems such as central processor (CPU) 102, random access memory (RAM) 104, input/output (I/O) controller 108, and read-only memory (ROM) 106, also known as firmware, which are interconnected by bus 110.

A BIOS containing the basic routines that help to transfer information between elements within computer system 10, such as during startup, including POST, preferably is stored in the ROM 106 or operably disposed in RAM 104. Computer system 10 further preferably includes I/O devices 200 such as display 208, for visual output, main storage device 202, for storing operating system 204, and application programs 206. The main storage device 202 preferably is connected to the CPU 102 through a main storage controller connected to bus 110.

Many other devices or subsystems 210 may be connected in a similar manner such as keyboard, pointing device (e.g., a mouse), floppy disk drive, CD-ROM player, printer and modem each connected via an I/O adapter.

It is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion.

Figure 2:
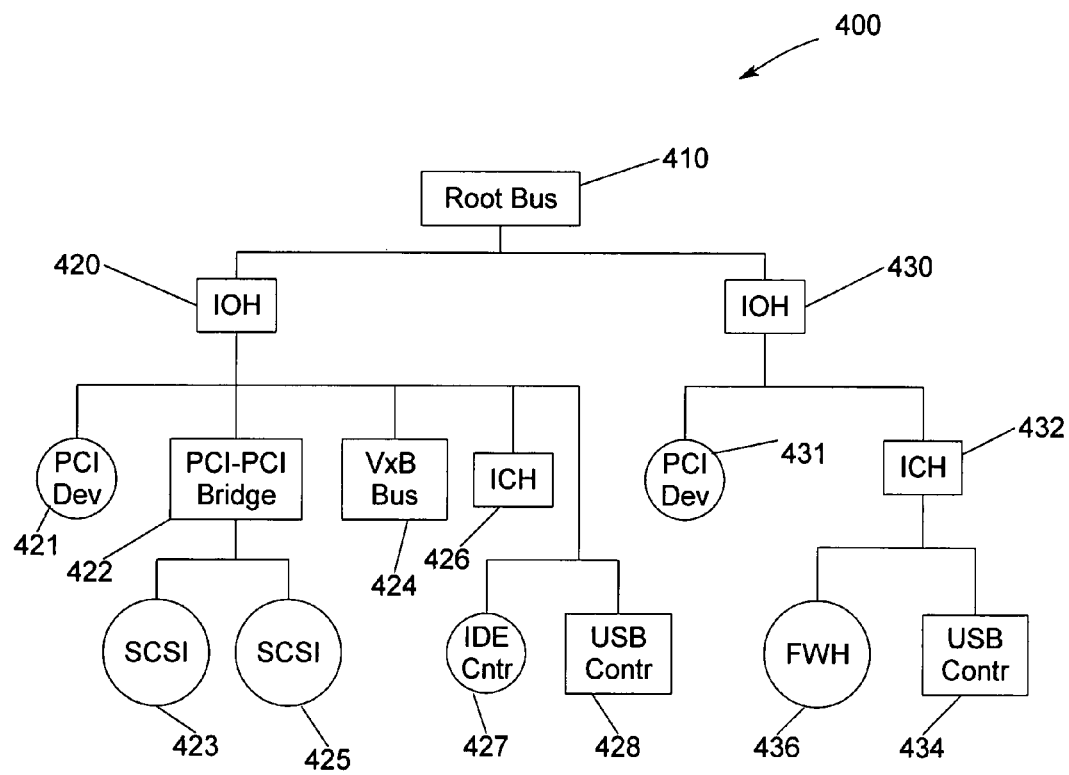
FIG. 2 is a block diagram of a sample bus and device configuration for a computer system of FIG. 1.

Referring now to FIG. 2, there is illustrated a block diagram of a sample bus and device configuration 400 for a computer system, where objects represented by rectangles are buses and objects represented by circles are devices connected to the buses. FIG. 2 begins with a root bus 410 preferably coupled to two input/output hubs (IOH), IOH 420 and IOH 430, respectively. IOH 420 preferably is coupled to peripheral component interconnect (PCI) device 421, PCI-PCI bridge bus 422, virtual extended bus (VxB) 424, input/output controller hub (ICH) 426, integrated drive electronics (IDE) controller 427 and universal serial bus (USB) controller 428. PCI-PCI bridge bus 422 preferably is further coupled to two small computer system interface (SCSI) devices 423 and 425, respectively. IOH 430 preferably is coupled to PCI device 431 and ICH 432. ICH 432 in turn preferably is connected to firmware hub (FWH) 436 and USB controller 434.

Figure 3:
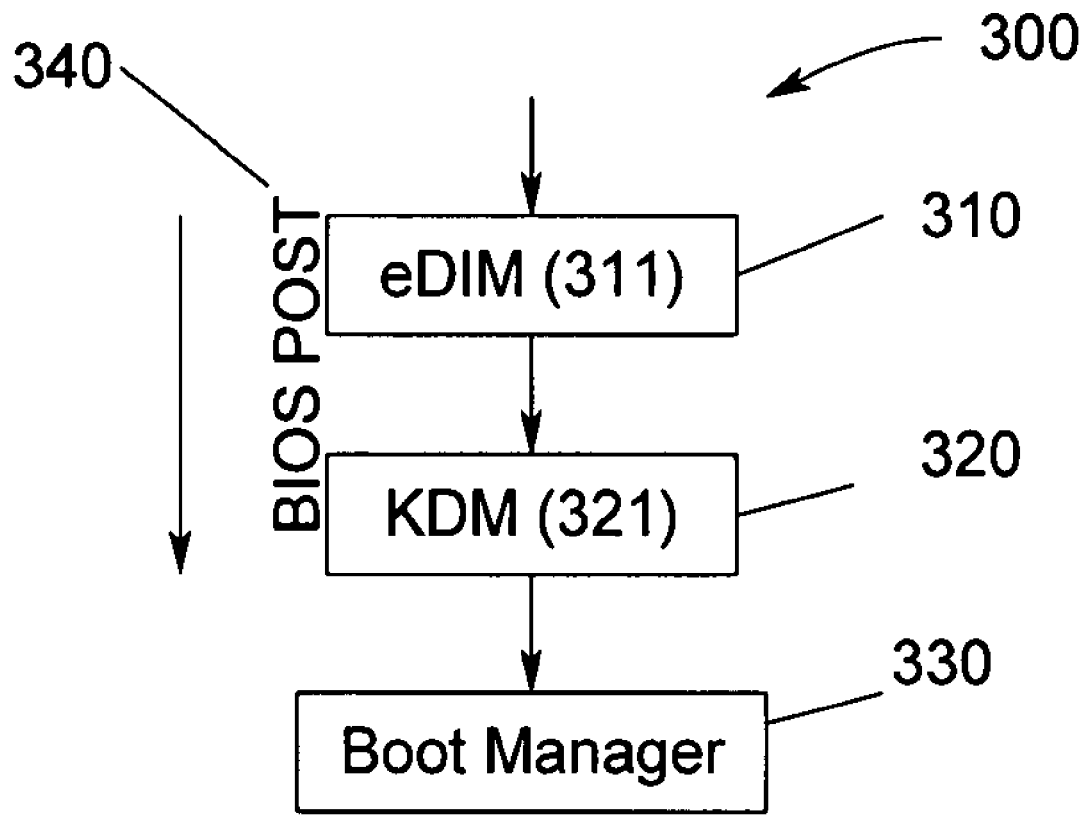
FIG. 3 is an operational flow of BIOS POST according to the preferred embodiment of the present invention.

Referring now to FIG. 3, a flow diagram is shown that illustrates a preferred step in a process 300 for BIOS POST 340. The BIOS POST 340 operational flow preferably consists of step KDM (step 320). In step 320, of process 300, POST preferably passes control to KDM 321 after performing the step eDIM (step 310). eDIM step 310 is fully described in United States Non-Provisional patent application entitled "BIOS IDENTIFICATION, INITIALIZATION AND MANAGEMENT," filed on Oct. 18, 2005, having assigned Ser. No. 11/252,486 and is incorporated herein by reference. Moreover, in step 310, the eDIM 311 preferably performs necessary initialization to enable root bus 410 and its subsystems of buses and devices. Next, in step 310, eDIM 311 preferably enumerates the buses, identifies buses and devices and allocates resources to the bus and devices preferably using device and bus specific instructions called eDrivers. In step 310, eDIM 311 preferably builds a device tree for the system which will be later utilized by other components in computer system 10 such as KDM 321 in BIOS POST 340. Thereafter, eDIM 311 preferably hands control back to POST 340.

Figure 8:
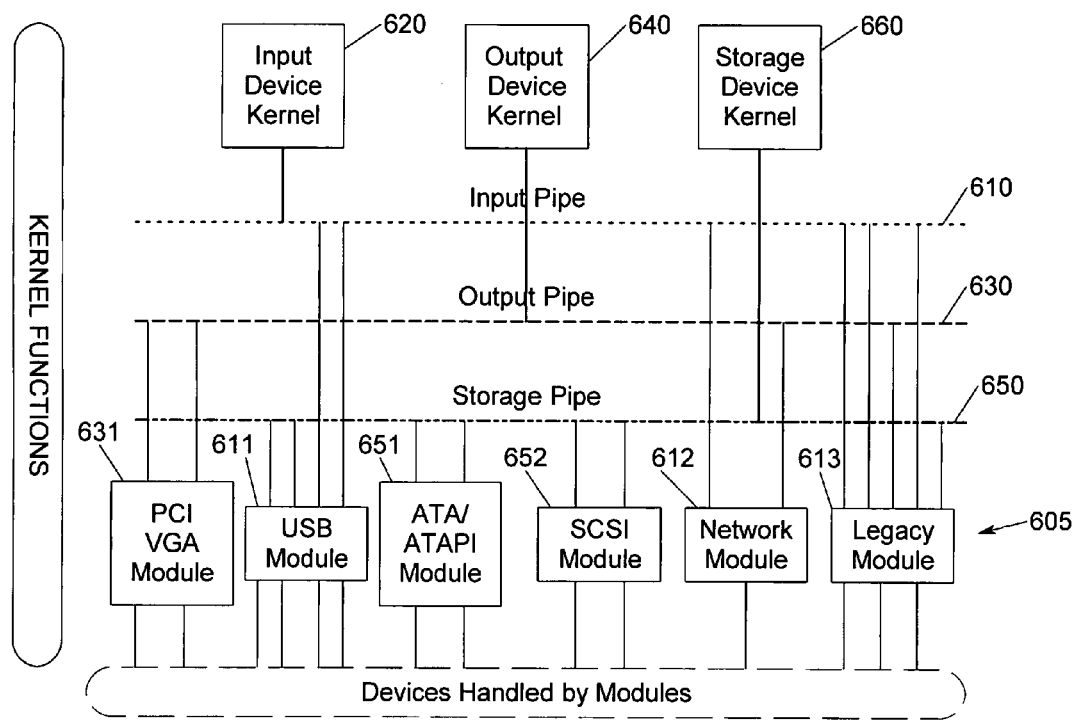
FIG. 8 is a block diagram of a sample bus and device configuration of FIG. 2 including device kernels, technology device modules and pipes according to a preferred embodiment of the present invention.

In step 320, of process 300, POST 340 preferably hands control to KDM 321. KDM 321 preferably configures and manages all the devices enumerated by the eDIM 311 in step 310. KDM 321 preferably has two components—device kernels and technology modules. KDM 321 preferably groups the technology modules based on priority and links them to their proper class specific kernel called Input Device Kernel (IDK) 620, Output Device Kernel (ODK) 640 and Storage Device Kernel (SDK) 660 through three types of pipes called Input Pipe 610, Output Pipe 630, and/or Storage Pipe 650 (as shown in FIG. 8). Technology modules which are capable of producing output pipes are considered high priority modules. For example, the technology specific modules handle devices specific to the technology, like VGA module 631, Network Module 612, SCSI module 652, and the like. Input Pipe 610, Output Pipe 630, and/or Storage Pipe 650 are effectively the preferred interfaces between each class kernel to operate a device. Depending on the devices functionality each technology module will have one or more pipes exposed for the class kernel to operate.

Figure 4:
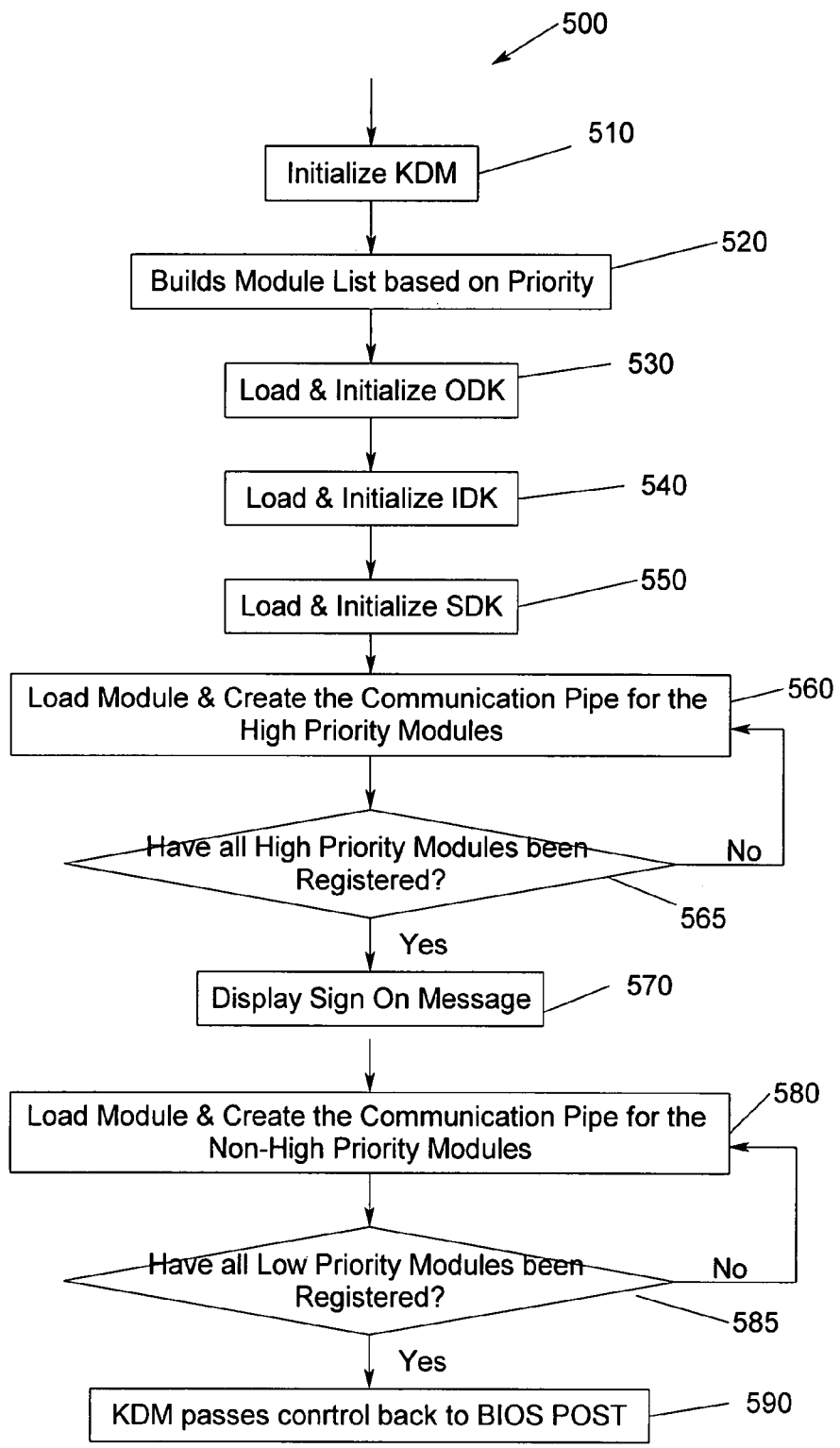
FIG. 4 is an operational flow of KDM according to a preferred embodiment of the present invention.

Referring now to FIG. 4, there is shown an operational flow, which illustrates process 500 of KDM 320 flow according to a preferred embodiment of the present invention. In step 510, of process 500, KDM 320 preferably receives control from BIOS POST 340 to initialize the devices enumerated by eDIM 310. In step 520, of process 500, KDM 321 preferably scans through the provided storage media such as Flash ROM, RAM or hard disk, for technology modules and creates a list of technology modules. Each technology module has a standard header as defined in Table 1 below.

TABLE 1

Technology Module Header Structure

```
typedef struct {
    DWORD   dModuleSize;    // Module size in paragraphs
    POINTER pNextModule;    // Pointer to next module
    BYTE    bModuleType;    // Module priority (high/low)
```

TABLE 1-continued

Technology Module Header Structure

```
    BYTE    bModuleStatus;      // Module status (enabled/dis)
    BYTE    aModuleName[16];    // ASCII module name
    POINTER OpenChannel;        // OpenChannel function call
    POINTER CloseChannel;       // CloseChannel function call
} TECH_MODULE_HDR;
```

Technology module header preferably provides enough data to group the modules based on priority and KDIM 321 preferably prioritizes the list by placing high priority modules at the top of the group list. For example, to facilitate faster output device initialization technology modules are given control in two phases. Technology modules which handle Output Devices 680 (defined in the technology module header) are given control before other technology modules such as Input Device 670 and Storage Device 690.

In step 530, of process 500, KDM 321 preferably loads ODK 640 into system memory and initializes ODK 640. After step 530, ODK preferably is ready to handle Output devices registered to it through Output Pipe 630. ODK 640 preferably is responsible for configuring and managing all Technology Device Modules that are capable of handling Output devices including but not limited to the following examples:

PCI, advanced graphics port (AGP), ISA and VGA (external INT10h interface)
monochrome display adapter (MDA) support (INT10h interface in the BIOS)
Console Redirection—Serial, Network; and the like.

ODK 640 preferably utilizes the existing AMIBIOS Display Manager (ADM) 710 for display management. BIOS POST 340 preferably utilizes ADM 710 calls for displaying messages while the runtime code will be handled by the INT10h functions. Device re-direction is supported only in the BIOS POST 340. ODK 640 is only operational during the. BIOS POST 340. Runtime portion preferably will be handled by the operating system. ODK 640 preferably consists of ADM 710 and output pipes created by the redirection modules.

In step 540, KDM 321 preferably loads and initializes IDK 620. After step 540 IDK preferably is ready to handle Input Pipes 610 registered by the Technology Device Modules capable of handling input devices. IDK 620 preferably is responsible for configuring and managing all Input Device Modules 670 including, but not limited to the following examples:

USB Keyboards and Mice
PS/2 Keyboards and Mice
Serial Mice
Console Redirection—Serial, Network; and the like.

IDK provides both POST and runtime interface. Runtime interface mainly consists of INT 16h functions. POST functions include identification of hot keys etc.

In steps 560, KDM 321 preferably loads and initializes SDK 660. After step 560, SDK 660 preferably is ready to handle Storage Pipes 650 registered by the Technology Device Modules capable of handling storage devices. SDK 660 preferably is responsible for configuring and managing all storage capable Technology Device Modules 690 including, but not limited to the following examples:

IDE HDD
ATAPI CDROM
ATAPI Removable Media Drives (ARMD) like ZIP, LS-120 and the like
SCSI drives
Magneto-Optical (MO) drives
USB HDD, CDROM, ZIP, LS-120, MO; and the like.

SDK 660 preferably has different sub-modules to separate, HDD, CDROM, ZIP and LS-120 devices. But these devices can be from any interface such as USB, IDE and the like. The POST and runtime interfaces are through INT13h calls. BIOS Boot Specification (BBS) module sits over the SDK 660 preferably to help the boot manager. BBS preferably creates the necessary data structures for the boot manager to choose the appropriate OS loader.

In step 560, of process 500, KDM 321 preferably recursively scans through the list of technology modules created in step 520 and loads high priority modules. In step 560, after loading the high priority technology module KDM 321 preferably issues OpenChannel ( ) call in the technology module. In the OpenChannel ( ) call preferably technology module searches through the device tree created by eDIM 311 for the devices specific to the technology it handles. For example, PCI Video technology driver 631 preferably will look for video devices behind the PCI, PCI-X, AGP or PCI-Express buses. The technology modules depending on the devices it finds in the device tree, preferably creates proper communication pipes (610, 630 or 650) and registers them with appropriate kernel drivers (620, 640, or 660) using kernel driver specific Register Pipe call. Register Pipe call preferably exposes the necessary entry points and data structures related to the technology module to the kernel drivers.

In step 565, of process 500, KDM 321 preferably searches for the next high priority module. Upon locating the next high priority module KDM 320 returns to step 560, otherwise, if no additional high priority modules are located in the module list built during step 520 KDM 321 moves on to the next step of process 500.

After all the high priority modules are loaded process 500 moves to step 570 where KDM 321 displays BIOS sign-on message and/or other outputs based on BIOS customization. KDM 321 may utilize standard ODK 640 external interface call, for example AMI Display Manager (ADM) calls to output sign-on messages.

In step 580, of process 500, KDM 321 preferably recursively scans through the list of technology modules created in step 520 and loads low priority modules. In step 580, after loading each low priority technology module KDM 320 issues OpenChannel ( ) call in the technology module. In the OpenChannel ( ) call the technology module preferably searches through the device tree created by eDIM 310 for the devices specific to the technology it handles. For example, SCSI technology driver 652 will look for SCSI devices behind the PCI, PCI-X or PCI-Express buses. Technology modules, depending on the devices found in the device tree, preferably creates proper communication pipes (610, 630, or 650) and registers them with appropriate kernel drivers (620, 640 or 660) using kernel driver specific Register Pipe call. RegisterPipe ( ) call preferably exposes the necessary entry points and data structures related to the technology module to the kernel drivers.

In step 585, of process 500, KDM 320 preferably searches for the next low priority module. Upon locating the next low priority module KDM 320 preferably returns to step 580, otherwise if no additional low priority modules are located in the module list built during step 520 KDM 320 moves on to the next step.

Figure 7:
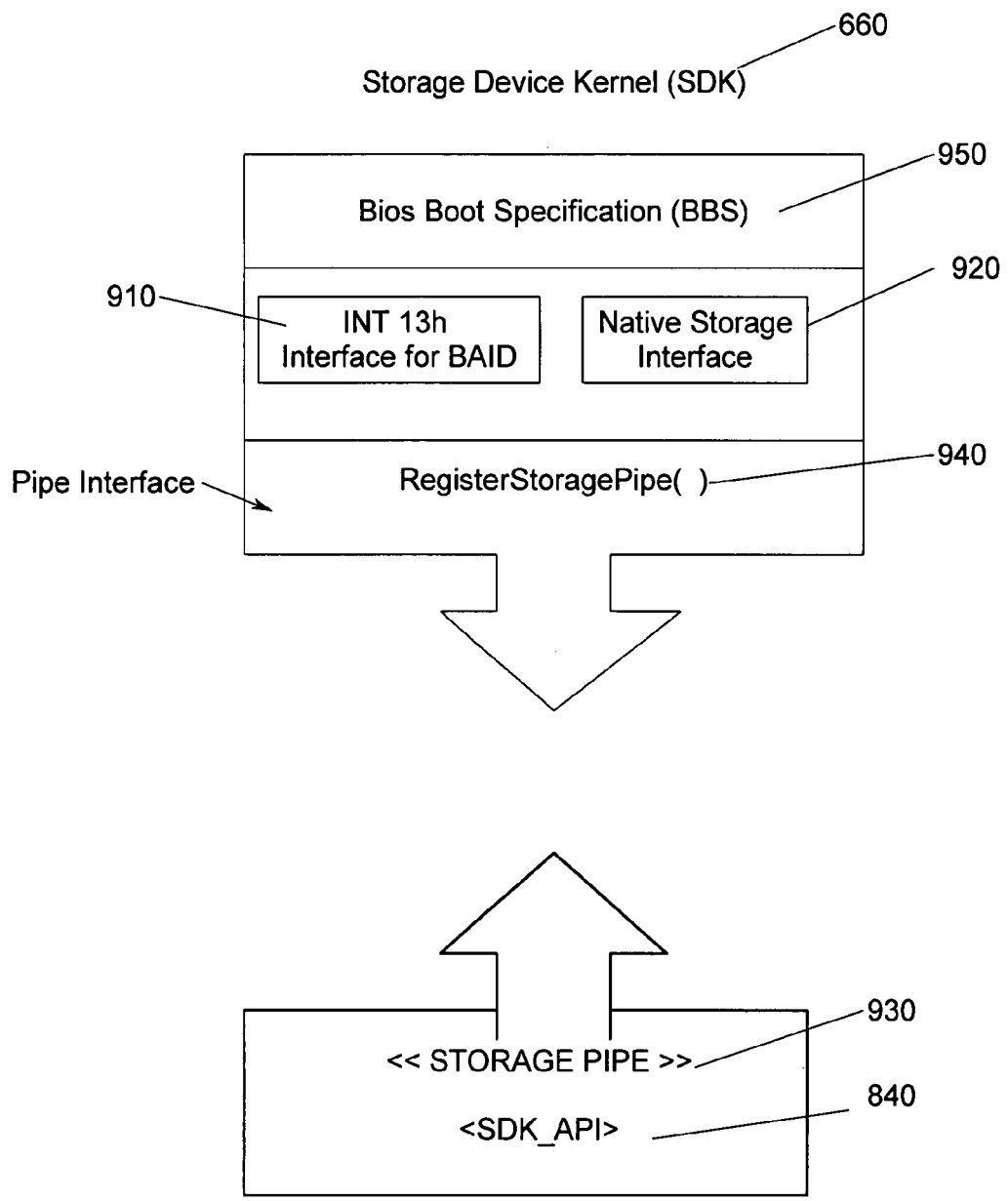
FIG. 7 is block diagram of a storage device kernel and associated storage pipe according to a preferred embodiment of the present invention.

In step 590, of process 500, KDM 320 passes control back to BIOS POST 340. When the control returns from this call the whole device kernel module organization will be built as represented in FIG. 7, wherein the device kernels, Technology Device Modules, and connecting pipes for each device in the computer system of FIG. 2 are registered.

OpenChannel ( ):

In steps 560 and 580, KDM 320 preferably loads, initializes and registers each technology module (both high and low priority modules) present in the system. KDM 320 preferably first loads the module into RAM 106. Next, KDM 320 preferably calls the OpenChannel ( ) function that is provided in the Technology Device Module 605 header (see Table 1), to initialize the Technology Device Module. In the OpenChannel ( ) function the Technology Device Module 605 searches through the device tree created by eDIM 310 to find all the devices that can be supported by this device module. For proper usage of the device, the device module creates one or more pipe data structure for each device and registers those pipes to the Device Kernels in KDM 320.

The following is the generic pipe data structure:

TABLE 2

Generic Pipe Data Structure

```
typedef struct {
    P_PIPE_DATA  pNextPipe;       // Pointer to the next pipe
    POINTER      pPipeAPI;        // Pointer to I/F functions
    POINTER      pDeviceInfoStruc; // Device Info structure
    BYTE         bPipeType;       // Pipe type: Input, output
} PIPE_DATA, * P_PIPE_DATA;
```

The device module preferably groups the pipes for the devices per the type of pipe (Input 610, Output 630, and Storage 650). For example, all the input pipes will be grouped together. A single device might need one or more types of pipes. For example, a console device preferably needs a pipe for Input and another pipe for Output. The device module creates the above data structure for all the pipes supported by the devices detected and links them together using 'pNextPipe' field. The device module registers these pipes to the Kernel Modules using the pipe specific Register Pipe function—RegisterInputPipe, RegisterOutputPipe and RegisterStoragePipe calls. After pipe registration OpenChannel ( ) call returns control back to KDM 320. KDM 320 preferably repeats the above process for all the device modules in the system.

RegisterInputPipe:

RegisterInputPipe function is part of the Input Device Kernel 620 (IDK). This call preferably is used by the technology modules to register the Input pipes to the IDK 620.

RegisterInputPipe (P_IN_PIPE_DATA * ppInPipeList):

IDK 620 preferably enables consolidation and processing of all the inputs from different input devices in a common place and processes them together. Technology Device Modules 605 capable of handling input devices preferably register input pipes with IDK 620 using 'RegisterInputPipe' call with the list of input pipe data structures. The input pipe data structure contains data required for IDK 620 to create and operate the input pipe. The structure of the input pipe data structure is outlined in FIG. 5A and Table 4 a high level code representation of the resource data structure according to the preferred embodiment of the present invention.

During RegisterInputPipe 740 preferably call 'ppInPipeList' is used as a pointer to a list of all the input pipe data structures for the devices reported by Technology Device Module 605. Technology Device Modules 605 preferably reports one structure for all the input pipes or one structure for each input pipe. Referring now to FIG. 5A and Table 4, the data structures preferably are linked using the pointer 'pNextPipe'. IDK 620 preferably links the 'ppInPipeList' to its global input pipe list.

TABLE 3

Input Pipe API Data Structure

```
typedef struct {
    STRING      sIdentifier;   // Identifier
    FP_POINTER  UpdateStatus;  // Pointer to UpdateStatus( )
    FP_POINTER  GetStatus;     // Pointer to GetStatus ( )
} IDK_API, * P_IDK_API;
```

TABLE 4

Input Pipe Data Structure

```
typedef struct {
    P_IN_PIPE_DATA  pNextPipe;        // Pointer to the next pipe
    P_IDK_API       pIDKAPI;          // Pointer to I/F functions
    POINTER         pDeviceInfoStruc; // Device Info structure
    BYTE            bPipeType;        // Pipe type: Input
} IN_PIPE_DATA, * P_IN_PIPE_DATA;
```

Figure 5:
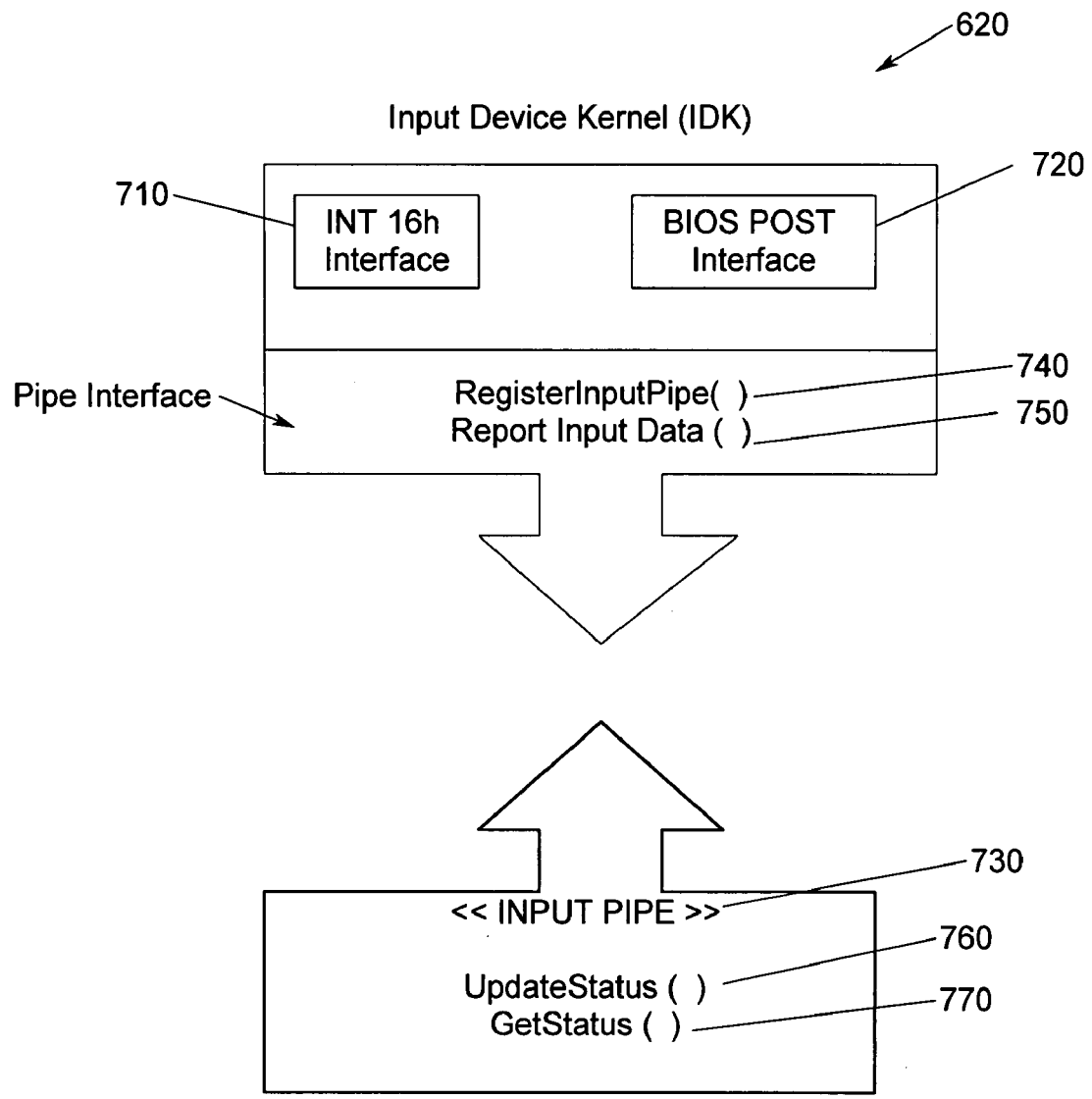
FIG. 5 is block diagram of an input device kernel and associated input pipe according to a preferred embodiment of the present invention.

Referring now to FIG. 5, there is shown a block diagram of IDK 620 and associated input pipe 730 according to the preferred embodiment of the present invention. IDK 620 preferably receives control from Technology Device Module 605 during input pipe registration using call 'RegisterInputPipe' 740 or whenever input data is available using call 'ReportInputData' 750. To obtain the status of the Input Device, IDK 620 issues GetStatus ( ) 770 call in the IDK API provided by the Input device. IDK 620 API data structure is described in Table 3. To modify the status of the input device IDK 620 issues UpdateStatus ( ) 760 call with the appropriate status value. UpdateStatus ( ) 760 call is mainly used to update the LED status on the PS2 or USB keyboard, however, the functionality is not limited to LED functionality.

ReportInputData (POINTER pInputPipeDataPtr, INPUT_DATA pInputData)

'ReportInputData' 750 routine preferably is invoked by Input Device Modules 605 whenever there is input data available for reporting. The first parameter ('Ptr') of 'ReportInputData' 750 routine preferably identifies which pipe is reporting the data while the second parameter ('DataStruc') preferably provides the input pipe data. The input pipe data is reported in a structure, wherein different types of data can be transferred using a single call. For example, input data can be from a mouse, key press in a keyboard or keyboard LED status. A key press preferably is reported in IBM PC compatible scan code set 2 scan codes and mouse data is reported as three byte x, y & z co-ordinates. LED status will be a byte with each bit representing the state of an LED.

IDK 620 preferably places the mouse and key press data in the queue for INT16h Interface 710 for processing. Also during BIOS POST 340, IDK 620 preferably searches for hot key combinations from input data and updates relevant status flags for BIOS POST Interface 340 at BIOS POST Interface 720. This procedure avoids unnecessary steps in the BIOS POST 340 flow such as having to check for key presses multiple times. LED status change preferably is reported to other input pipes so that all the LEDs in all the input devices (if supported) indicate the same state. As mentioned before, LED status preferably is reported to other input pipes using the 'UpdateStatus' 760 call. The first parameter ('List') of 'UpdateStatus' 760 routine preferably identifies the device while the second parameter ('StatusStruc') provides the status of such device.

RegisterOutputPipe ( )

The RegisterOutputPipe function preferably is part of the Output Device Kernel 640 (ODK). This call preferably is used by the Technology Device Modules 605 to register the output pipes to the ODK 640.

RegisterOutputPipe (P_OUT_PIPE_DATA ppOutPipeList)

ODK 640 design preferably enables dispersion of outputs to different output devices. For example, the sign-on message for the BIOS preferably is sent to ODK 640 and ODK 640 disperses the sign-on message output to VGA display as well as Serial Console Redirection terminal. Technology Device Modules 605 preferably are capable of handling output device registers with ODK 640 using 'RegisterOutputPipe' call with the list of output pipe data structures. The output pipe data structure contains data required for ODK 640 to create and operate the output pipe 630. The structure of the output pipe data structure is outlined in Error! Reference source not found, a high level code representation of the resource data structure according to the preferred embodiment of the present invention.

During RegisterOutputPipe 840 call 'ppOutPipeList' preferably is utilized as a pointer to a list of all the output pipe data structures for the output devices reported by Output Device capable Technology Modules. Technology Device Modules 605 preferably report one structure for all the output pipes or one structure for each output pipe. Referring now to Error! Reference source not found, the data structures are linked using the pointer 'pNextPipe'. ODK 640 links the 'ppOutPipeList' to its original global output pipe list.

TABLE 5

Output Pipe API Data Structure

```
typedef struct {
    STRING       sIdentifier;    // Identifier
    BYTE         bDevType;       // INT10h or Other
    FP_POINTER   GetMode;        // Pointer to GetMode( )
    FP_POINTER   SetMode;        // Pointer to SetMode( )
    FP_POINTER   SendData;       // Pointer to SendData( )
    FP_POINTER   GetPosition;    // Pointer to GetPosition ( )
    FP_POINTER   SetPosition;    // Pointer to SetPosition ( )
    FP_POINTER   GetAttribute;   // Pointer to GetAttribute ( )
    FP_POINTER   SetAttribute;   // Pointer to SetAttribute ( )
    FP_POINTER   DisplayLogo;    // Pointer to DisplayLogo ( )
} ODK_API, * P_ODK_API;
```

TABLE 6

Output Pipe Data Structure

```
typedef struct {
    P_OUT_PIPE_DATA  pNextPipe;         // Pointer to the next pipe
    P_ODK_API        pODKAPI;           // Pointer to I/F functions
    POINTER          pDeviceInfoStruc;  // Device Info structure
    BYTE             bPipeType;         // Pipe type: Output
} OUT_PIPE_DATA, * P_OUT_PIPE_DATA;
```

Figure 6:
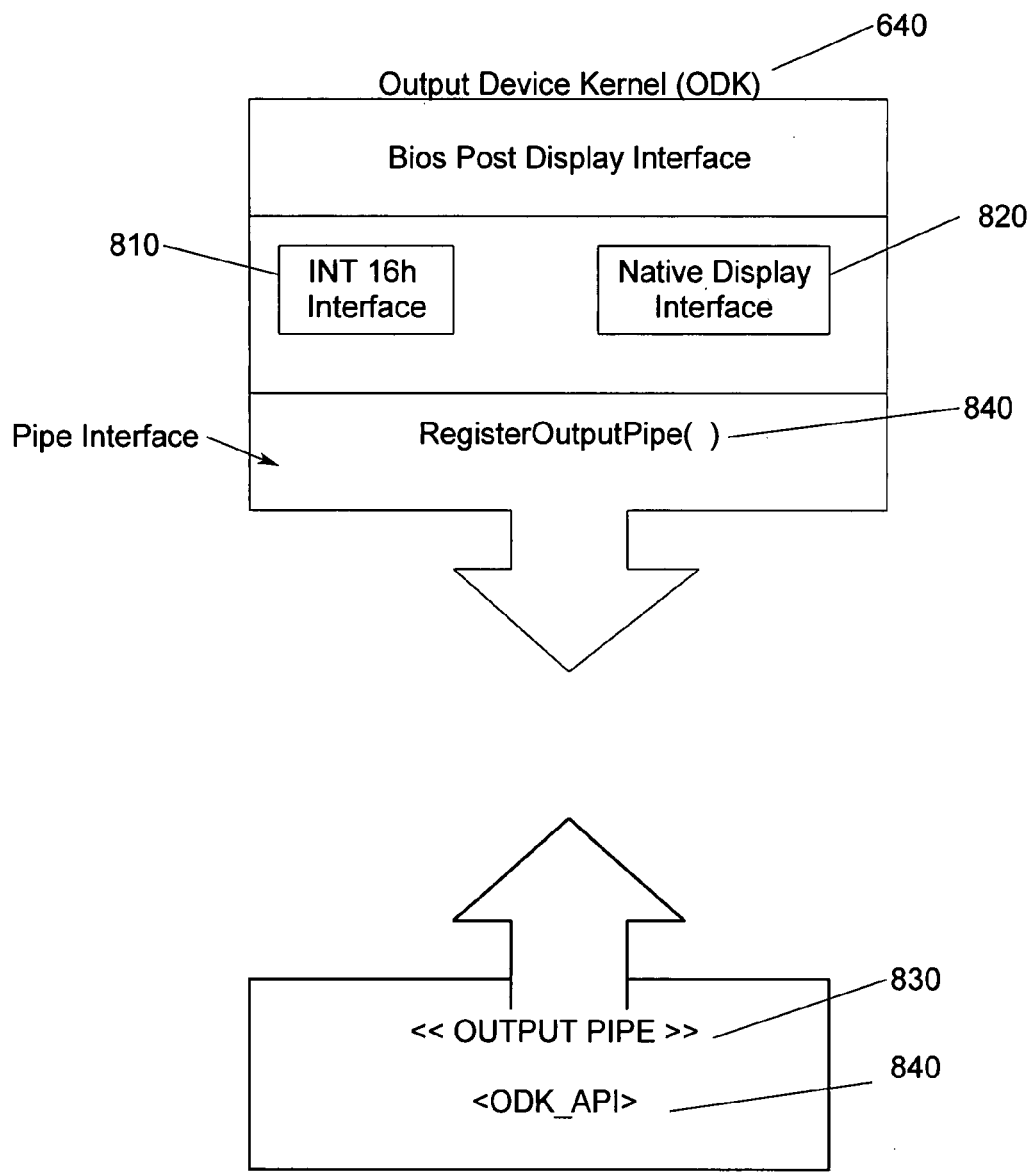
FIG. 6 is block diagram of an output device kernel and associated output pipe according to a preferred embodiment of the present invention.

Referring now to FIG. 6, there is shown a block diagram of ODK 640 and associated output pipe 830 according to the preferred embodiment of the present invention. ODK 640 preferably receives control from KDM 320 during output pipe registration using call 'RegisterOutputPipe' 840 as set forth in FIG. 6. ODK 640 preferably receives display requests from BIOS POST and sends such requests to the various output pipes using the ODK API described in Table 5. The 'sidentifier' uniquely identifies the device that supports the pipe. The 'bDevType' identifies the output device type. Currently, the supported device types are "INT10H_OUTPUT_DEVICE" and "GENERIC_OUTPUT_DEVICE". For "INT10h_OUTPUT_DEVICE" ODK 640 preferably utilizes the Interrupt 10h (as described in AMIBIOS8 Technical Reference Manual or any similar specifications) to display relevant information. There can be only one output pipe with the type "INT10h_OUTPUT_DEVICE". For "GENERIC_OUTPUT_DEVICE" ODK 640 preferably utilizes ODK API calls to display the strings. For example, PCI VGA Technology driver preferably registers the VGA device as "INT10H_OUTPUT_DEVICE," whereas the Serial Console Redirection module preferably registers the output device as "GENERIC_OUTPUT_DEVICE". BIOS POST can indicate which pipe should receive the output by specifying the unique identifier. For example, BIOS POST can send all the debug messages to Serial Console by specifying the Serial Console pipe identifier with its display messages.

RegisterStoragePipe:

The RegisterStoragePipe function is part of the Storage Device Kernel 660 (SDK). This call is used by the technology modules to register the Storage pipes to the SDK 660.

RegisterStoragePipe (P_STOR_PIPE_DATA ppStorPipeList)

SDK 660 preferably enables consolidated handling of all storage devices in a common place and processes them together, thus, reducing code space. The technology modules that support storage devices registers the Storage Pipes 650 with SDK 660 using 'RegisterStoragePipe' 940 call with the list of storage pipe data structures. The storage pipe data structure contains data required for SDK 660 to create and operate the storage pipe 650. The structure of the storage pipe data structure is outlined in Table 8 a high level code representation of the resource data structure according to the preferred embodiment of the present invention.

During RegisterStoragePipe 940 call 'ppStorPipeList' is used as a pointer to a list of all the storage pipe data structures for the storage devices reported by Technology Device Modules 605 capable of handling Storage Devices. Technology Device Modules 605 preferably reports one structure for all the storage devices or alternatively one structure for each storage device. Referring now to Table 8, the data structures are linked using the pointer 'pNextPipe'. SDK 660 preferably links the 'pStorPipeList' to its global storage pipe list.

TABLE 7

Storage Pipe API Data Structure

```
typedef struct {
    STRING       sIdentifier;    // Identifier
    BYTE         bDevType;       // BCV or BEV or Native
    FP_POINTER   EntryVector;    // Pointer to EntryVector( )
    FP_POINTER   Inquiry;        // Pointer to Inquiry ( )
    FP_POINTER   GetMaxLBA;      // Pointer to GetMaxLBA ( )
    FP_POINTER   ReadBlock;      // Pointer to ReadBlock ( )
    FP_POINTER   WriteBlock;     // Pointer to WriteBlock ( )
    FP_POINTER   GetStatus;      // Pointer to GetStatus ( )
} SDK_API, * P_SDK_API;
```

TABLE 8

Storage Pipe Data Structure

```
typedef struct {
    P_STOR_PIPE_DATA  pNextPipe;       // Pointer to the next pipe
    P_SDK_API         pSDKAPI;         // Pointer to I/F functions
    POINTER           pDeviceInfoStruc; // Device Info structure
    BYTE              bPipeType;       // Pipe type: Storage
} STOR_PIPE_DATA, * P_STOR_PIPE_DATA;
```

Referring now to FIG. 7, there is shown a block diagram of SDK 660 and associated storage pipe 930 according to the preferred embodiment of the present invention. SDK 660 preferably receives control from KDM 320 during storage pipe registration using call 'RegisterStoragePipe' 940 as set forth in FIG. 7. SDK 660 preferably receives block device read/write access from the BIOS POST and the OS boot loader and fulfills those requests using the SDK API (described in Table 7) provided by the Technology Device Modules 605. The 'sidentifier' uniquely names the storage device. The 'bDevType' identifies the output device type. The supported device types are 'STORAGE_BCV', 'STORAGE_BEV', 'STORAGE_FDD_TYPE', 'STORAGE_HDD_TYPE' and 'STORAGE_CD_TYPE'. The 'STORAGE_BCV' and 'STORAGE_BEV' type devices are equivalent to the 'Boot Connect Vector' (BCV) and 'Boot Entry Vector' (BEV) type devices defined in the BIOS BOOT Specification (BBS) 950. For example, PCI SCSI or PCI IDE add-on cards preferably registers BCV and BEV type storage pipes with SDK 660. For the device types 'STORAGE_BCV' and 'STORAGE_BEV' SDK 660 preferably issues Entry Vector ( ) function as defined in the BIOS Boot Specification, other functions such as Inquiry, GetMaxLBA etc. are not utilized. Storage device types 'STORAGE_FDD_TYPE', 'STORAGE_HDD_TYPE' and 'STORAGE_CD_TYPE' devices are called Native Storage devices. For Native Storage devices, SDK 660 preferably issues Inquiry ( ) command to get the type of the device, issues GetMaxLBA ( ) to get the maximum addressable block number, issues ReadBlock and WriteBlock calls to read and write a block and issue GetStatus to check the media presence status for the removable media storage devices such as Floppy Drive or Flash Card readers.

Referring now to FIG. 8, there is illustrated a block diagram of kernel functions 600 for a computer system, where horizontal lines are pipes (Input Pipe 610, Output Pipe 630, and/or Storage Pipe 650), squares above the pipes are device kernels Input Device Kernel (IDK) 620, Output Device Kernel (ODK) 640 and Storage Device Kernel (SDK) 660) and squares below the pipes are Technology Device Modules 605, wherein vertical lines represent connections between either device kernels and pipes or technology device modules and pipes. More specifically, technology device modules preferably include PCI/VGA Module 631, USB Module 611, ATA/ATAPI Module 651, SCSI Module 652, Network Module 612, and Legacy Module 613.

For example, in step 560, of process 500, KDM 320 preferably recursively initializes and registers each high priority module present in configuration 400. KDM 320 preferably loads the first high priority module PCI/VGA Module 631. Next, KDM 320 preferably issues QpenChannel ( ) call provided by the PCI VGA Module 631. In the OpenChannel ( ) call PCI VGA Module 631 preferably searches through the device tree created by the eDIM 310 for the devices it supports. PCI/VGA Module 631 preferably handles the device PCI Dev 421. PCI/VGA Module 631 preferably passes control to the VGA option ROM present in the PCI Dev 421 after copying the option ROM into system RAM. PCI/VGA Module 631 preferably creates an ODK_API data structure (defined in Table 5) of type "INT10H_OUTPUT_DEVICE" with the sidentifier set to name of PCI Dev 421. PCI/VGA Module 631 preferably creates and registers an Output Pipe data structure using RegisterOutputPipe ( ) call after filling in ODK_API pointer and other relevant data. After RegisterOutputPipe ( ) call to ODK 640 control preferably is returned to KDM 320 at step 565.

Next, KDM 320 preferably loads the next high priority module Legacy Module 613 and issues OpenChanne ( ) call provided by the Legacy Module 613. In the OpenChannel ( ) call the Legacy Module 613 searches through the device tree created by the eDIM 310. Legacy Module 613 preferably handles bus ICH 426, and ICH hub 432 including legacy devices PS/2, COMI and COM2. Legacy Module 613 preferably creates Input pipe data structure (described in Table 4) for PS/2 and COMI devices and registers the Input pipe with the IDK 620 using RegisterInputPipe ( ) call. Legacy Module 613 preferably creates Output pipe data structure (described in Table 6) for COM1 device and register the Output Pipe 630 with the ODK 640 using RegisterOutputPipe ( ) call. Legacy Module 613 preferably creates storage pipe data structure (described in Table 8) for Legacy IDE controller present in ICH 426 and registers the storage pipe 650 with the SDK 660 using RegisterStoragePipe ( ) call. Control preferably is returned back to KDM 320 at step 565.

Next, KDM 320 preferably loads the next high priority module Network Module 612 and issues OpenChannel ( ) call provided by the Network Module 612. In the Open Channel ( ) call the Network Module 612 searches through the device tree created by eDIM 310. Network Module 612 preferably handles the network device PCI Dev 431. Network Module 612 preferably passes control to the network option ROM present in the PCI Dev 431 after copying the option ROM into system RAM. Network Module 612 preferably supports both Input and Output Pipes. Network Module 612 creates the Input pipe data structure (described in Table 4) with appropriate IDK API information obtained from the PCI Dev 431. Network Module 612 preferably registers the above created Input pipe with the IDK 620 using RegisterInputPipe ( ) call. Network Module 612 creates an ODK_API data structure (defined in Table 5) of type "GENERIC_OUTPUT_DEVICE" with the function pointers for handling output set appropriately. The sidentifier parameter in the ODK API preferably is set to the name of PCI Dev 431. Network Module 612 preferably creates and registers an Output Pipe data structure using RegisterOutputPipe ( ) call after filling in ODK_API pointer and other relevant data. After RegisterOutputPipe ( ) call to the ODK 640 control preferably is returned back to KDM 320 at step 565.

Next, KDM 320 preferably searches through the device module list to identify the next high priority module and does not locate a module. Since no additional high priority modules are present, KDM 320 preferably moves on to the next step in process 500.

In step 580, of process 500, KDM 320 preferably recursively initializes and registers each low priority module present in configuration 400. KDM 320 preferably loads the first low priority module USB Module 611. KDM 320 issues OpenChannel ( ) call provided by the USB Module 611. USB Module 611 preferably searches through the device tree created by eDIM 310 to locate the USB controllers. USB Module 611 preferably handles the USB controllers 428 and 434. USB Module 611 preferably configures and enumerates the USB controllers 428 and 434. During the enumeration process, if USB keyboard or mouse is detected then USB Module 611 preferably creates Input data structure (described in Table 4) for each USB keyboard and mouse detected and links them together and registers the Input pipes to IDK 620 using RegisterInputPipe ( ) call. If USB Module 611 detects USB Mass Storage devices such as USB Flash drive or USB floppy drive or USB Hard Disk, then USB Module 611 preferably creates Storage data structure for each storage device found, links them together and registers the Storage pipes with the SDK 660 preferably using RegisterStoragePipe ( ) call. Thereafter, control preferably is returned back to KDM 320 at step 585.

Next, KDM 320 preferably loads the next low priority module ATA/ATAPI Module 651 and issues OpenChannel ( ) call provided by the ATA/ATAPI Module 651. In the OpenChannel ( ) call the ATA/ATAPI Module 651 preferably searches through the device tree created by the eDIM 310. ATA/ATAPI Module 651 preferably handles the IDE Controller 427. ATA/ATAPI Module 651 preferably initializes and enumerates the IDE Controller 427. During the enumeration process, if ATA/ATAPI Module 651 preferably detects ATA IDE Hard Disk(s) or ATAPI IDE CDROM/DVD-ROM, then ATA/ATAPI Module 651 preferably creates Storage data structure for each storage device found, links them together and registers the Storage pipes with the SDK 660 using RegisterStoragePipe ( ) call. Thereafter, control preferably is returned back to KDM 320 at step 585.

Next, KDM 320 preferably loads the next low priority module SCSI Module 652 and issues OpenChannel ( ) call provided by the SCSI Module 652. In the OpenChannel ( ) call the SCSI Module 652 preferably searches through the device tree created by the eDIM 310. SCSI Module 652 preferably handles the SCSI devices 423 and 425. SCSI Module 652 preferably copies the option ROM from the SCSI devices 423 and 425 into system RAM and passes control to the option ROM. At the end of the execution, the option ROM preferably provides entries for BCV and BEV based on SCSI enumeration process. SCSI Module 652 preferably creates Storage data structure for each storage device found, links them together and registers the Storage pipes with the SDK 660 using RegisterStoragePipe ( ) call. Thereafter, control preferably is returned back to KDM 320 at step 585.

Next, KDM 320 preferably searches through the device module list to identify the next low priority module and does not locate a module. Since no additional low priority modules are present, KDM 320 preferably moves on to the next step in process 500.

Upon all devices being initialized and registered, in step 585, KDM 320 preferably passes control back to POST. At the end of the above flow KDM 320 preferably has configured all devices found in the system and created appropriate pipes for each device. The boot manager, last stage in the POST, preferably utilizes the IDK 620 and ODK 640 for user interface and SDK 660 to load the appropriate OS loader. Boot manager loads the OS loader using SDK 660 into the system RAM and gives control to it. The OS loader loads the OS and thus the BIOS POST terminates.

Modularity and Scalability

KDM 320 in a preferred embodiment is designed to support modularity and scalability of the BIOS by separating each bus and device handling means into an independent module, which allows for the re-architecture, addition or deletion of a module corresponding to the addition or removal of support for a particular bus, device or technology without affecting the other modules. A BIOS with a modular design preferably enables support for existing and evolving architectures such as IA64 and IA32 platform architectures. Modular design preferably enables support for both legacy free and legacy platform architectures. Legacy preferably refers to previous buses and or devices. If the BIOS code is legacy free then the BIOS does not have to support previous buses and or devices allowing for the BIOS code to be reduced in size and improving boot up reliability and runtime. In addition, the modular design allows down scaling of the BIOS for a particular system design or known embedded system. Extracting a subset of BIOS code from the modular general BIOS code reduces the BIOS size and improves boot reliability and runtime. Both legacy free and down scaling preferably benefit from the modular design's ability to eliminate the need to rewrite and debug code line-by-line when adding or removing support for a bus and or device.

Option ROM

Option ROMs preferably are programs that provide software functionality for a particular type of hardware or Module. If a Module has an option ROM then it has to make a special type of memory request. The rules of the architecture determine the method for allocating memory space needed for the option ROMs. In the current legacy computer systems, the architecture is PCI so all option ROMs must have memory space allocated to the device under 1 Meg, between the address spaces of 0xC0000-0xF0000.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method of performing a modularized set of BIOS initialization instruction of a device within a computer system, said method comprising the steps of:
   a) creating a list of technology modules and prioritizing said list of technology modules for the devices of the system;
   b) prioritizing each technology module giving priority to output devices before input devices and storage devices;
   c) loading an output device kernel into the system memory and initializing said output device kernel (ODK);
   d) loading an input device kernel into the system memory and initializing said input device kernel (10K); and
   e) loading a storage device kernel into the system memory and initializing said storage device kernel (SDK).

2. The method of claim 1, wherein said step of loading an output device kernel further comprises the step of configuring and managing the system output devices.

3. The method of claim 1, wherein said step of loading an input device kernel further comprises the step of configuring and managing the system input devices.

4. The method of claim 1, wherein said step of loading a storage device kernel further comprises the step of configuring and managing the system storage devices.

5. The method of claim 1, wherein said method further comprises the step of recursively initializing and registering each said high priority output device and creating a communication pipe for said device of the system.

6. The method of claim 1, wherein said method further comprises the step of displaying a BIOS sign on message.

7. The method of claim 1, wherein said method further comprises the step of recursively initializing and registering each said low priority input device and creating a communication pipe for said device of the system.

8. The method of claim 1, wherein said method further comprises the step of recursively initializing and registering each said low priority storage device and creating a communication pipe for said device of the system.

9. A computer system comprising:
   a) a central processing unit (CPU) having registers associated therewith and executing a basic input/output system (BIOS);
   b) a read-only memory (ROM) in communication with said CPU and containing BIOS code executable on said CPU;
   c) a random access memory (RAM) in communication with said CPU, wherein said CPU, ROM, RAM and BIOS being configured to:
   create a list of technology modules and prioritizing said list of technology modules for the devices of the system;
   prioritize each technology module giving priority to output devices before input devices and storage devices;
   load an output device kernel into the system memory and initializing said output device kernel (ODK);
   load an input device kernel into the system memory and initializing said input device kernel (10K); and
   load a storage device kernel into the system memory and initializing said storage device kernel (SDK).

10. A computer system according to claim 9 further comprising isolated code sections that perform specific functions.

11. A computer system according to claim 9 further comprising subroutines that support specific hardware devices.

12. A computer system according to claim 9 further comprising support for IA64 and IA32 platform architectures.

13. A computer system according to claim 9 further comprising support for full BIOS modularity facilitating the removal or addition of support for a device.

14. A computer system according to claim 9 further comprising support for legacy free and legacy platform architecture.

15. A computer system according to claim 9 further comprising support bridge hopping.

16. A computer system according to claim 9 further comprising support option ROMs.

17. A computer system according to claim 9 further comprising support for separate north and south bridge code.

18. A computer system according to claim 9 further comprising resource and error logging.

* * * * *